United States Patent
Dolata et al.

(10) Patent No.: US 11,691,761 B2
(45) Date of Patent: Jul. 4, 2023

(54) DETACHABLE POWER CABLE FOR UNMANNED AERIAL VEHICLE

(71) Applicant: FlyFocus Sp. z.o.o., Warsaw (PL)

(72) Inventors: Kacper Antoni Dolata, Warsaw (PL); Igor Jan Skawinski, Warsaw (PL); Bartlomiej Mateusz Zawada, Warsaw (PL); Julian Daniel Zyromski, Warsaw (PL)

(73) Assignee: FlyFocus Sp. z.o.o., Warsaw (PL)

( * ) Notice: Subject to any disclaimer, the term of this patent is extended or adjusted under 35 U.S.C. 154(b) by 279 days.

(21) Appl. No.: 16/876,203

(22) Filed: May 18, 2020

(65) Prior Publication Data

US 2020/0369408 A1    Nov. 26, 2020

Related U.S. Application Data

(60) Provisional application No. 62/849,201, filed on May 17, 2019.

(51) Int. Cl.
| | |
|---|---|
| *B64F 3/02* | (2006.01) |
| *B64C 39/02* | (2006.01) |
| *B64D 47/08* | (2006.01) |
| *B60L 53/16* | (2019.01) |
| *B60L 53/20* | (2019.01) |
| *B60L 53/66* | (2019.01) |

(52) U.S. Cl.
CPC ............... *B64F 3/02* (2013.01); *B60L 53/16* (2019.02); *B60L 53/20* (2019.02); *B60L 53/66* (2019.02); *B64C 39/022* (2013.01); *B64D 47/08* (2013.01); *B60L 2200/10* (2013.01); *B60L 2210/10* (2013.01); *B60L 2210/30* (2013.01); *B64C 2201/027* (2013.01); *B64C 2201/042* (2013.01); *B64C 2201/066* (2013.01); *B64C 2201/108* (2013.01); *B64C 2201/127* (2013.01)

(58) Field of Classification Search
CPC ........... B64F 3/02; B64D 47/08; B64C 39/02; B64C 39/022; B64C 2201/027; B64C 2201/042; B64C 2201/066; B64C 2201/127; B64C 2201/108; B60L 53/16; B60L 53/20; B60L 53/66; B60L 2210/10; B60L 2210/30
USPC .......................................................... 244/17
See application file for complete search history.

(56) References Cited

U.S. PATENT DOCUMENTS

| | | |
|---|---|---|
| 9,446,858 B2 | 9/2016 | Hess |
| 2018/0050798 A1* | 2/2018 | Kapuria ................. B60L 58/12 |

(Continued)

*Primary Examiner* — Richard Isla
*Assistant Examiner* — Dung V Bui
(74) *Attorney, Agent, or Firm* — Budzyn IP Law, LLC

(57) ABSTRACT

A surveillance drone system is provided herein generally including an UAV, a base power station, and, a tether for connecting the UAV to the base power station to provide electrical power to the UAV when airborne. The base power station may include a cable take-up assembly for releasing and taking up the tether. A plug or power module is provided at the free end of the tether configured to be detachably coupled with the UAV, to transmit electrical power to, and, possibly, data to and from, the UAV. With the plug or power module being detached, the UAV is free to fly unrestricted. This arrangement allows for the UAV to be airborne for prolonged periods to allow for monitoring a region and for release to allow the UAV to investigate anomalies in the monitored region.

17 Claims, 15 Drawing Sheets

(56) References Cited

U.S. PATENT DOCUMENTS

2018/0056794 A1* 3/2018 Kim ..................... B60L 53/126
2018/0072170 A1* 3/2018 Evans ..................... B60L 53/60
2018/0118374 A1* 5/2018 Lombardini .......... B64C 39/024
2018/0287833 A1* 10/2018 Kennedy ................. H04L 25/26

* cited by examiner

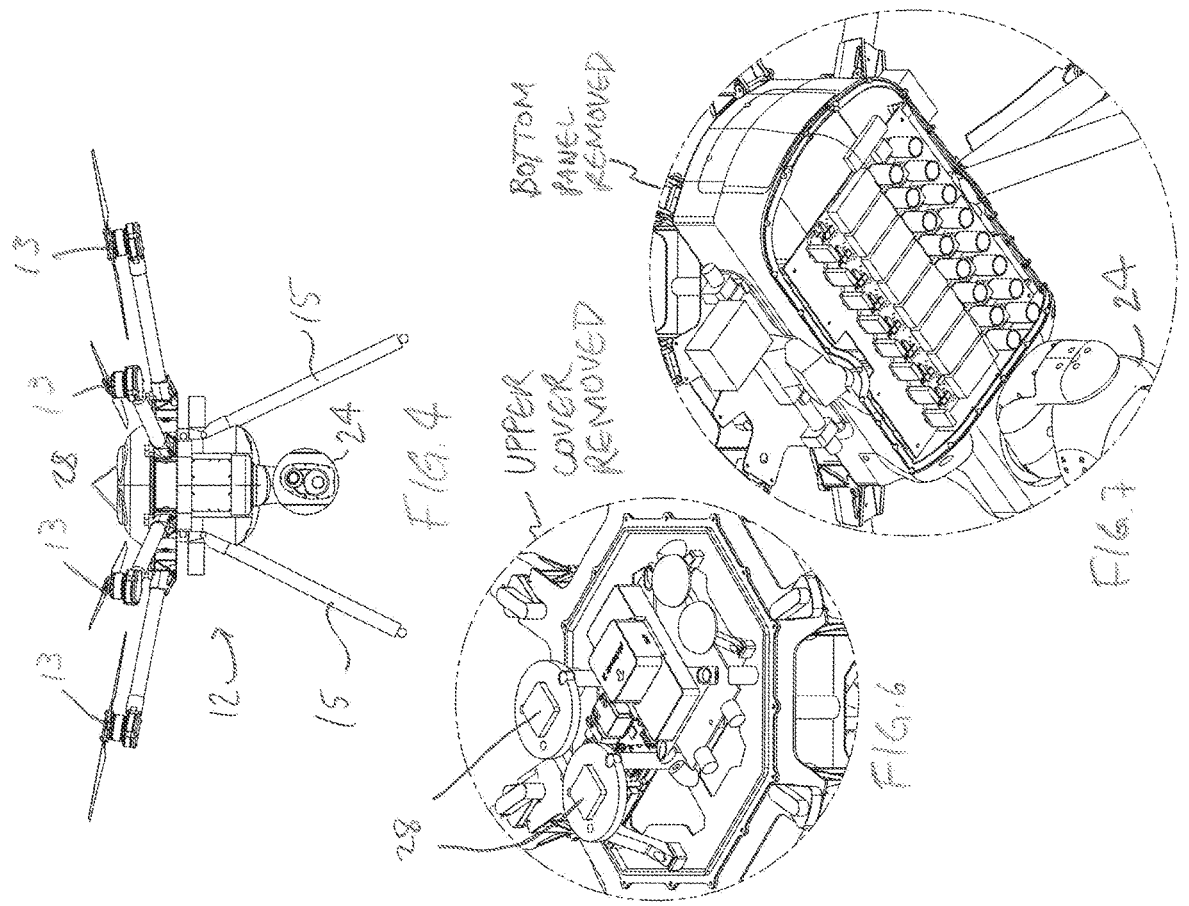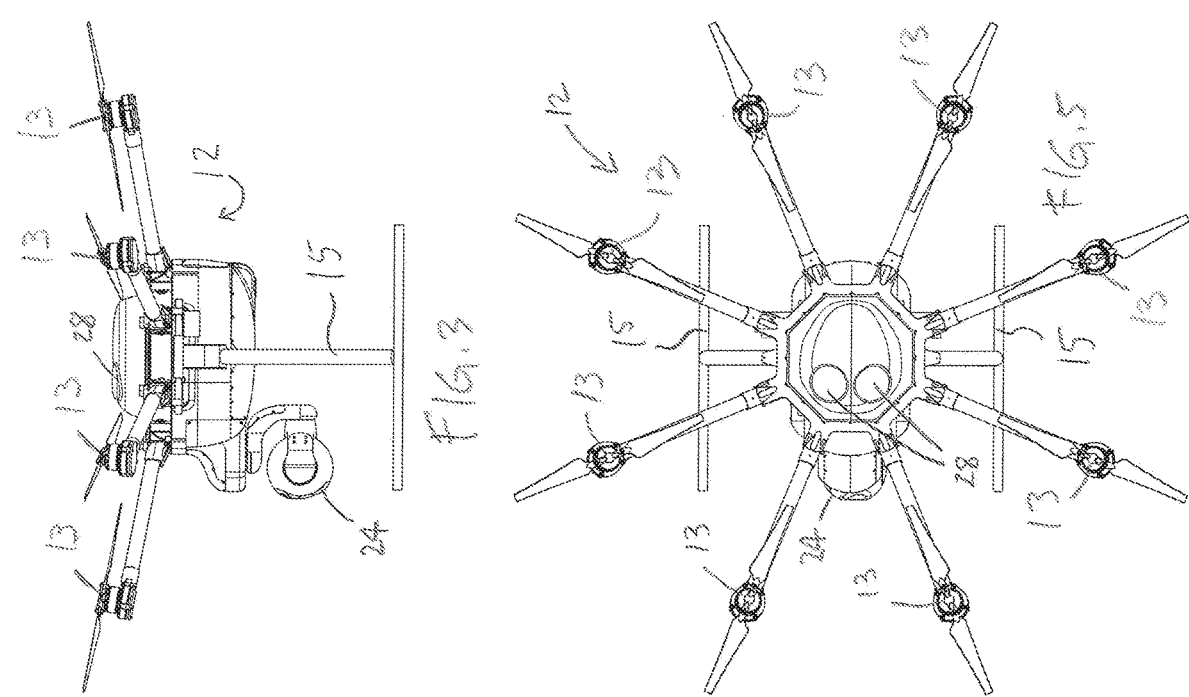

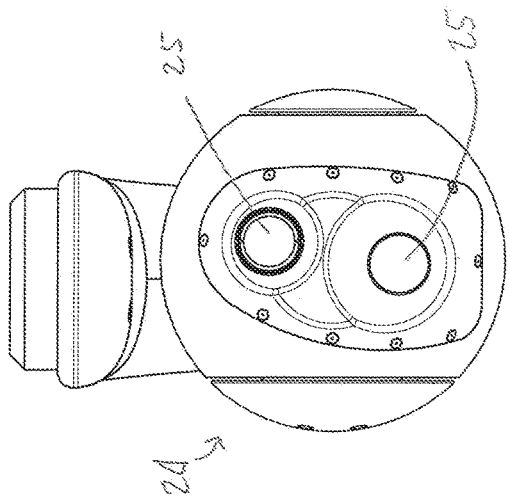
FIG. 11
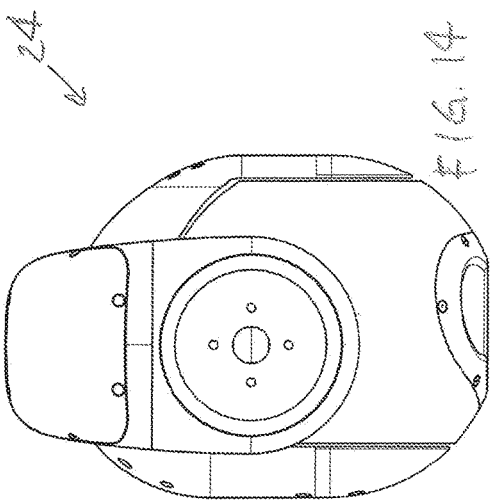
FIG. 14
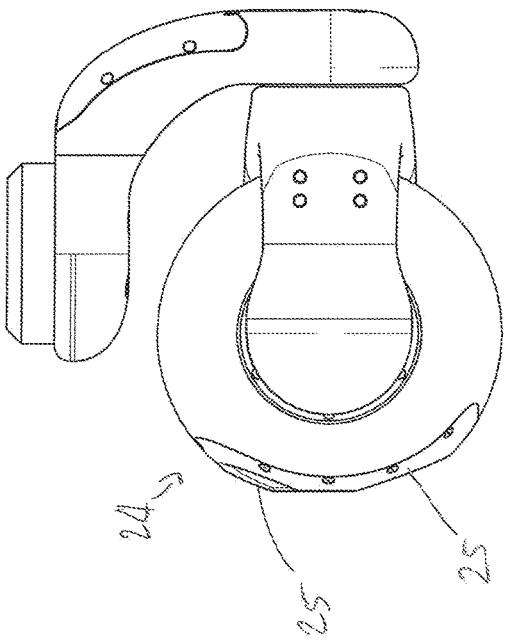
FIG. 10
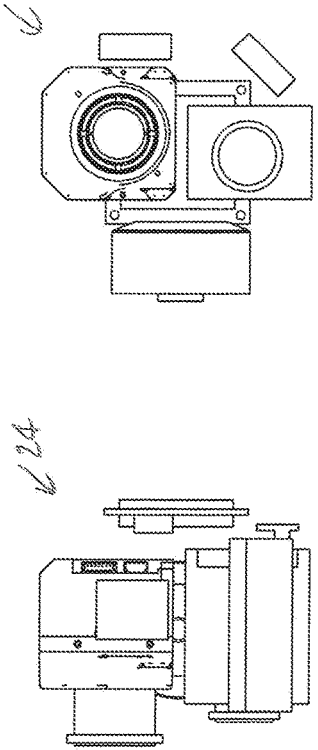
FIG. 13
FIG. 12

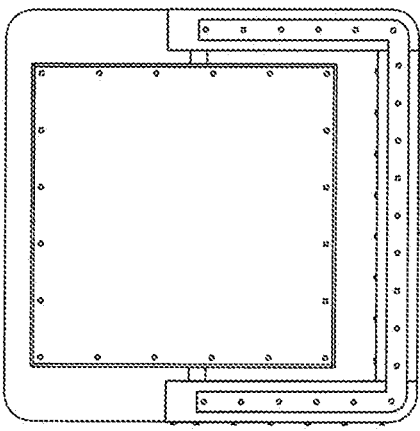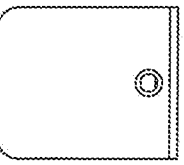
FIG. 15
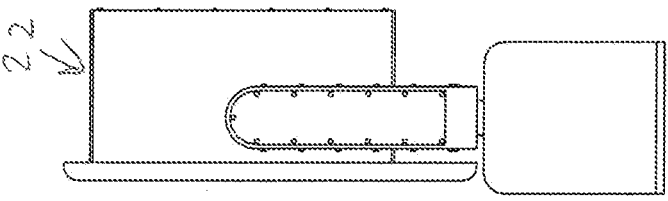
FIG. 16
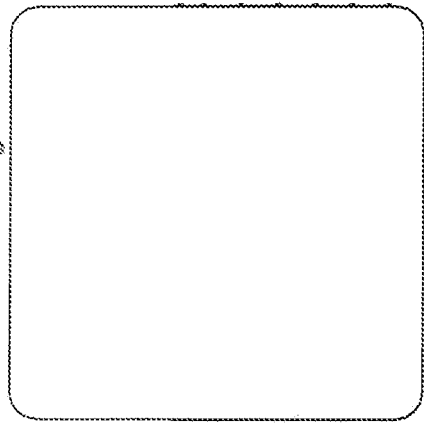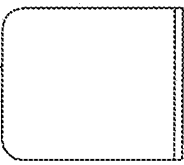
FIG. 17

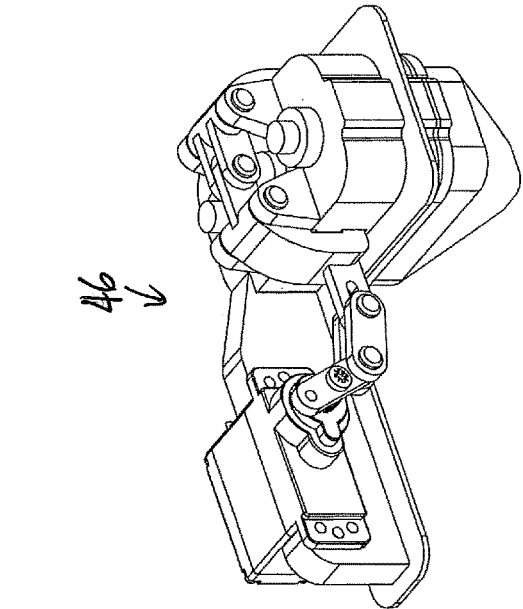
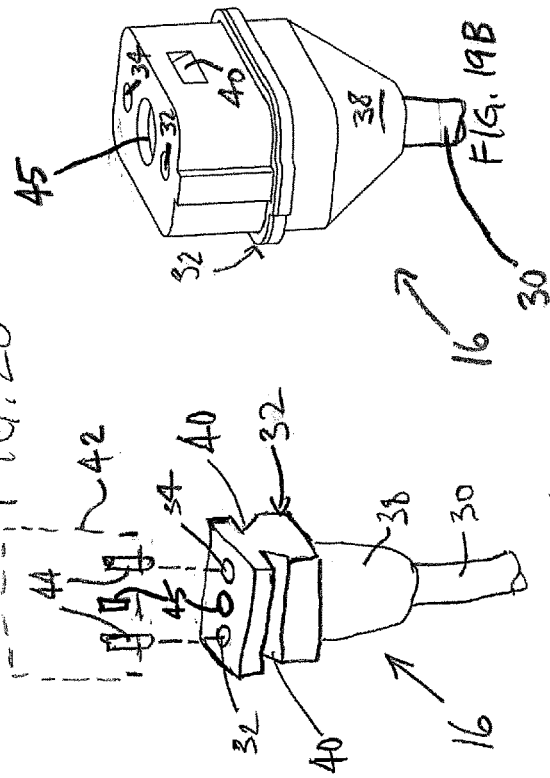
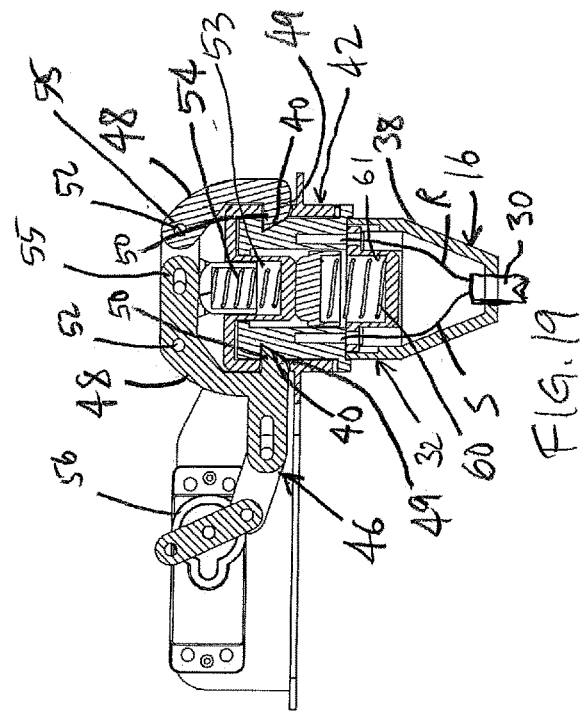
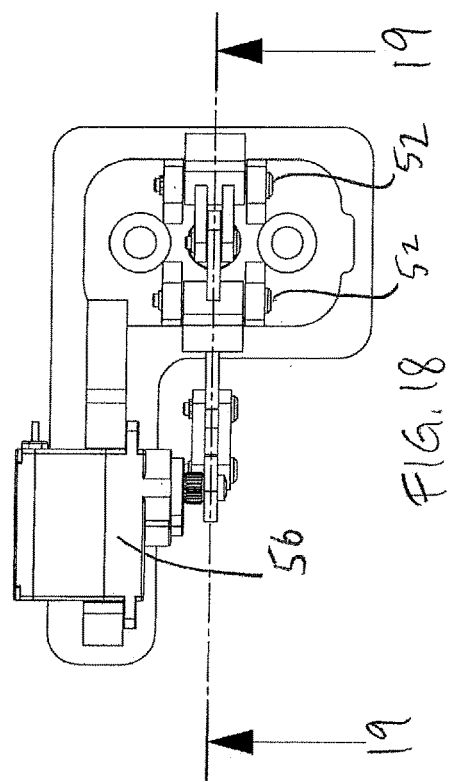

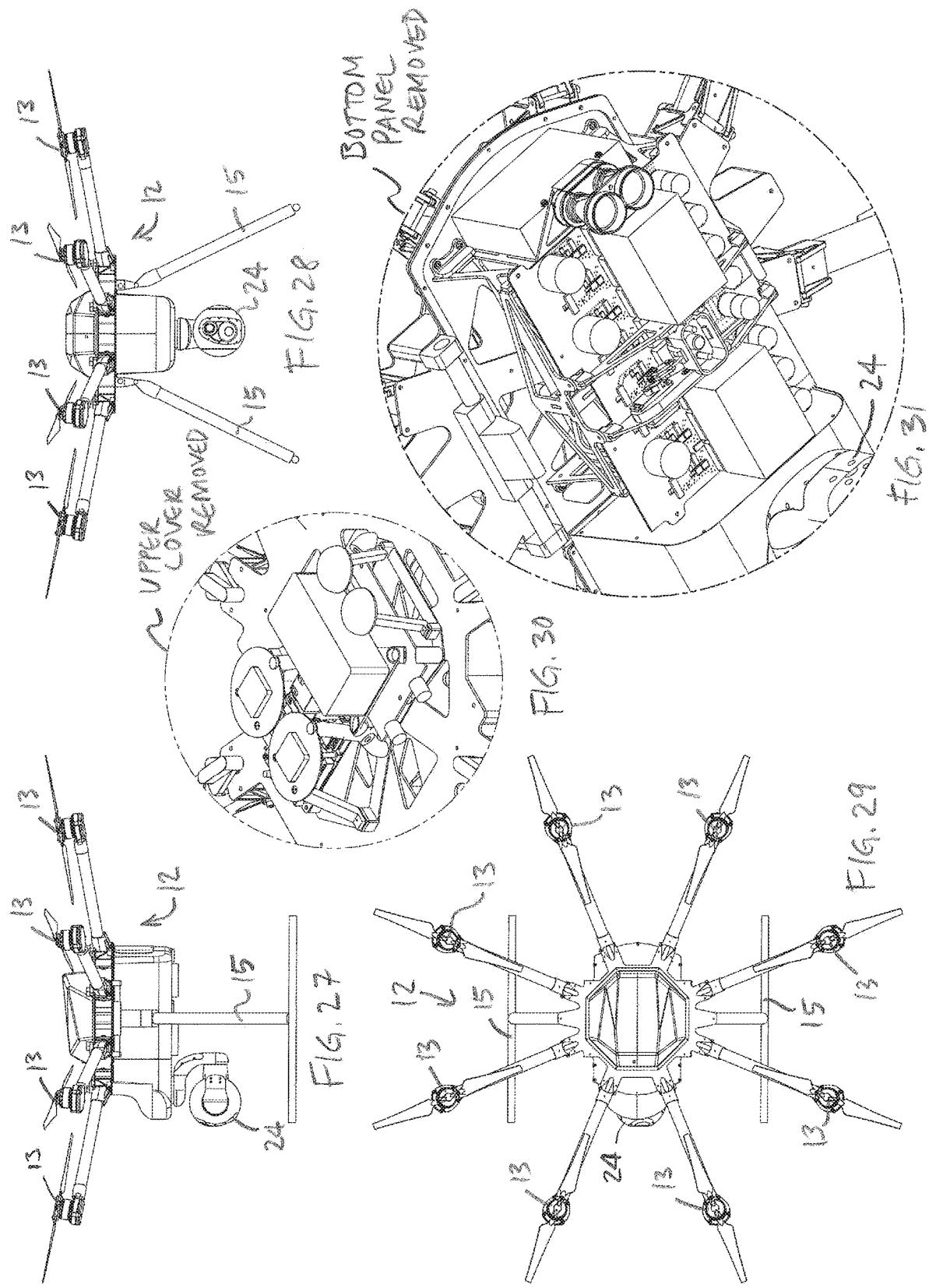

DETACHABLE POWER CABLE FOR UNMANNED AERIAL VEHICLE

CROSS-REFERENCE TO RELATED APPLICATION

This application claims priority to U.S. Provisional Patent Appl. No. 62/849,201, filed May 17, 2019, the entire contents of which are incorporated by reference herein.

BACKGROUND OF THE INVENTION

Unmanned aerial vehicles (UAVs) are well known in the art. UAVs are typically multi-rotor vehicles which are electrically powered. One limitation in maintaining an UAV airborne is battery life. As a result, UAVs typically must be sent to, or return to, a source of power.

U.S. Pat. No. 9,446,858 to Hess et al. discloses a tether connected to an UAV to provide power and flow of data between a ground unit and the UAV. The flow of data may include control signals being sent to the UAV and captured data (e.g., video data) being sent from the UAV. The Hess et al. tether is connected by a harness without ability to controllably detach when airborne.

SUMMARY OF THE INVENTION

A surveillance drone system is provided herein generally including an UAV, a base power station, and, a tether for connecting the UAV to the base power station to provide electrical power to the UAV when airborne. The base power station may include a cable take-up assembly for releasing and taking up the tether. A plug or power module is provided at the free end of the tether configured to be detachably coupled with the UAV, to transmit electrical power to, and, possibly, data to and from, the UAV. With the plug or power module being detached, the UAV is free to fly unrestricted. This arrangement allows for the UAV to be airborne for prolonged periods to allow for monitoring a region and for release to allow the UAV to investigate anomalies in the monitored region.

These and other features of the subject invention will be better understood through a study of the following detailed description and accompanying drawings.

BRIEF DESCRIPTION OF THE DRAWINGS

FIGS. 3-7 are different views of an UAV useable with the subject invention;

FIGS. 8-14 depict cameras useable with an UAV in accordance with the subject invention;

FIGS. 15-17 depict a wireless transmitter/receiver useable with an UAV in accordance with the subject invention;

FIG. 18 is a top plan view of a retaining mechanism useable with an UAV for detachable coupling with a tether in accordance with the subject invention;

FIG. 19 is a cross-sectional view taken along line 19-19 of FIG. 18;

FIGS. 19A and 19B depict plug configurations useable with the subject invention;

FIG. 20 is a perspective view of the retaining mechanism of FIG. 18;

FIGS. 27-31 are different views of a further UAV useable with the subject invention;

DESCRIPTION OF THE INVENTION

Figure 1:
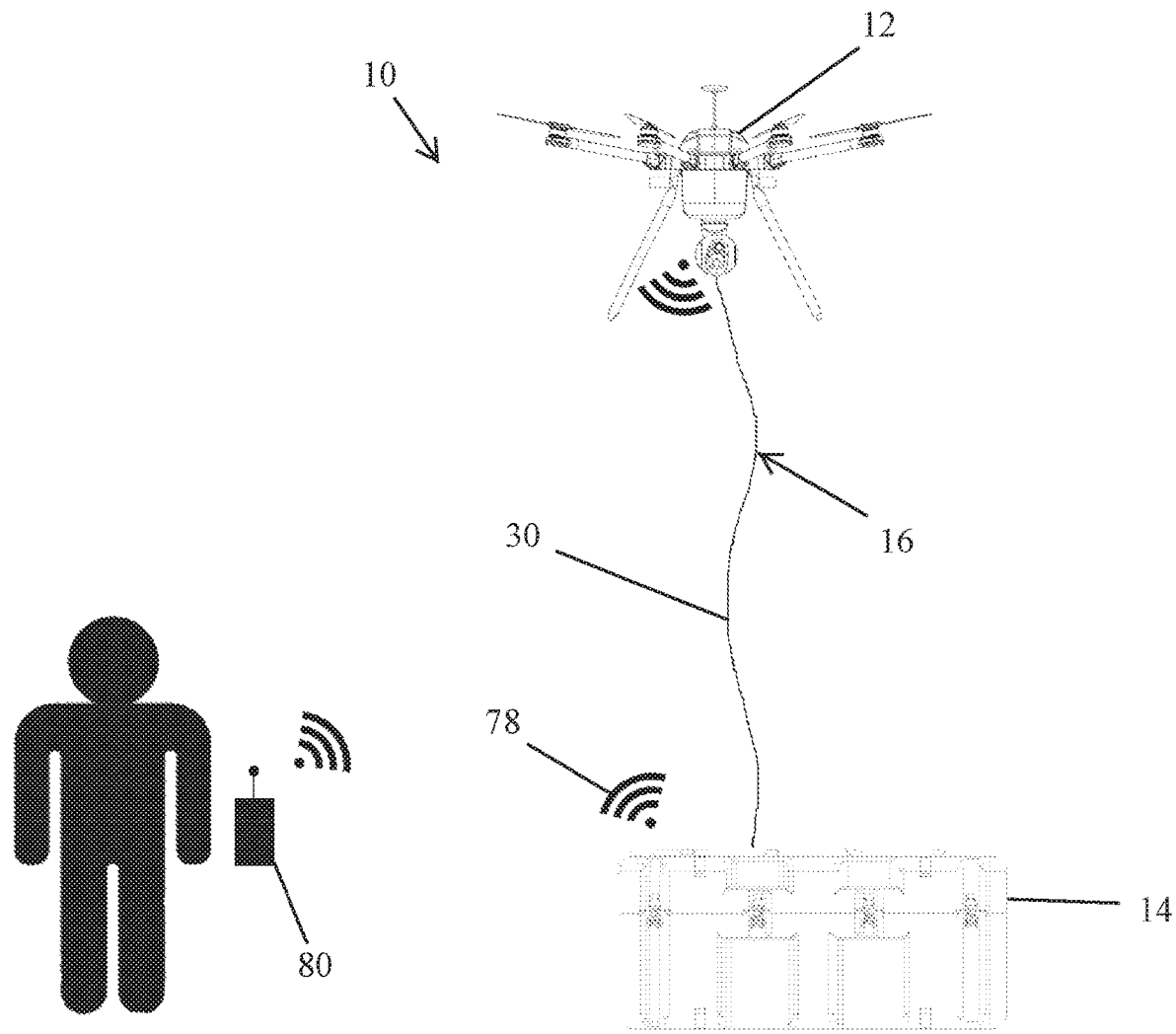
FIG. 1 depicts a surveillance drone system in accordance with the subject invention.

With reference to FIG. 1, a surveillance drone system 10 is provided which generally includes an UAV 12, a base power station 14, and a tether 16 for connecting the UAV 12 to the base power station 14.

The UAV 12 may be of any known type which is electrically powered. The UAV 12 may be multi- or single-rotor. As shown in FIGS. 3-5 and 27-31, the UAV 12 may be of the multi-rotor type with a plurality of winged rotors 13. Landing skids 15 may be provided to support the UAV 12 when landing and resting on the ground.

Figure 2:
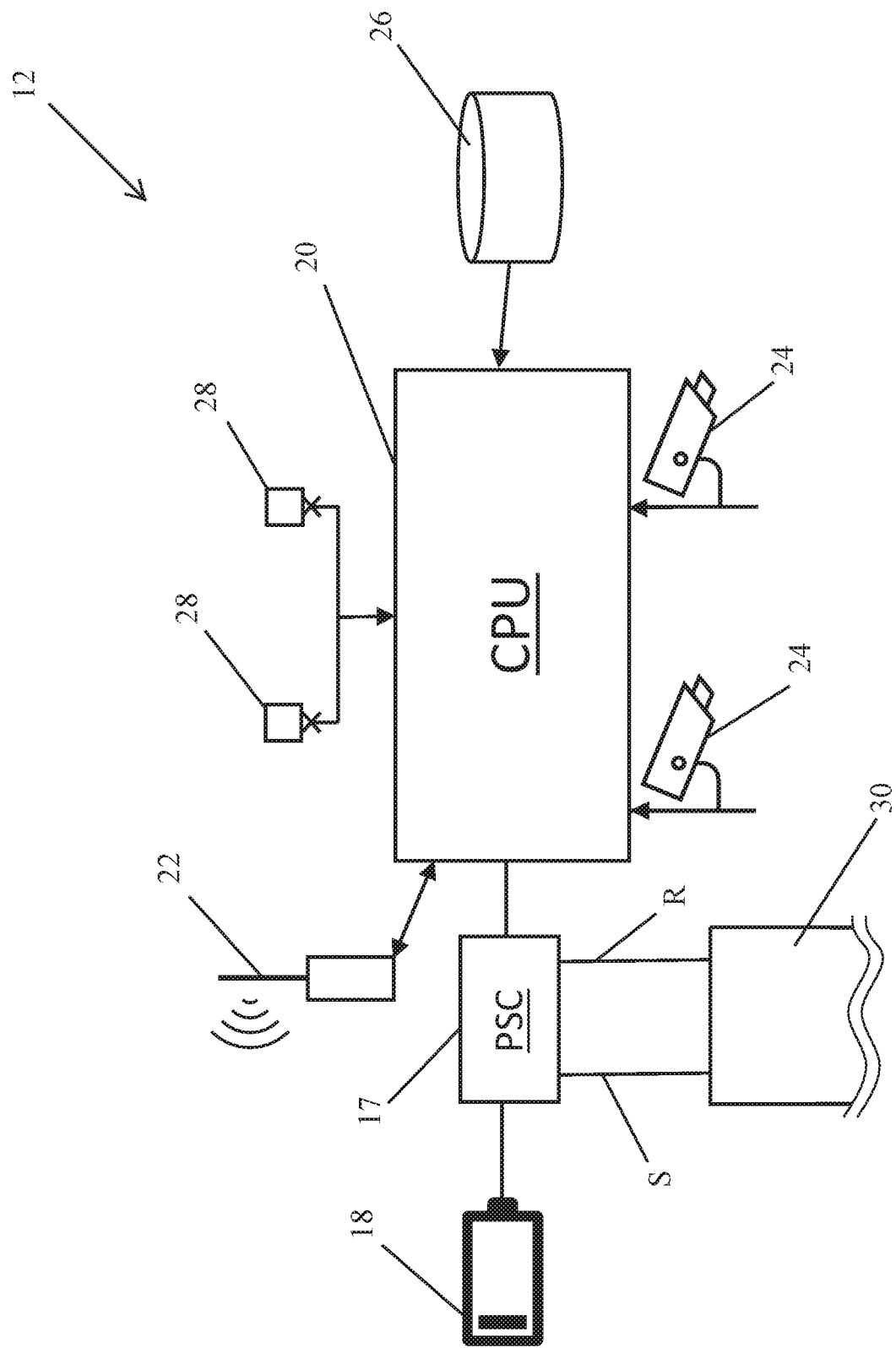
FIG. 2 is a schematic of a computing processing unit (CPU) and other components which may be included on an UAV in accordance with the subject invention.

With reference to FIG. 2, the UAV 12 preferably includes an on-board rechargeable battery 18 that is electronically connected to motors for operating the winged rotors 13 and other components of the UAV 12 (i.e., the battery 18 has sufficient capacity to power the entire UAV 12). The UAV 12 also includes a computing processing unit (CPU) 20 configured to control the UAV 12. The CPU 20 may be in the form of, and/or include, a flight management system, as known in the art. The CPU 20 may control the flight characteristics of the UAV 12, including speed, altitude, steering and so forth. A wireless transmitter/receiver 22 may be provided on the UAV 12 operatively linked to the CPU 20 to receive and transmit control signals to and from the CPU 20.

Figure 9:
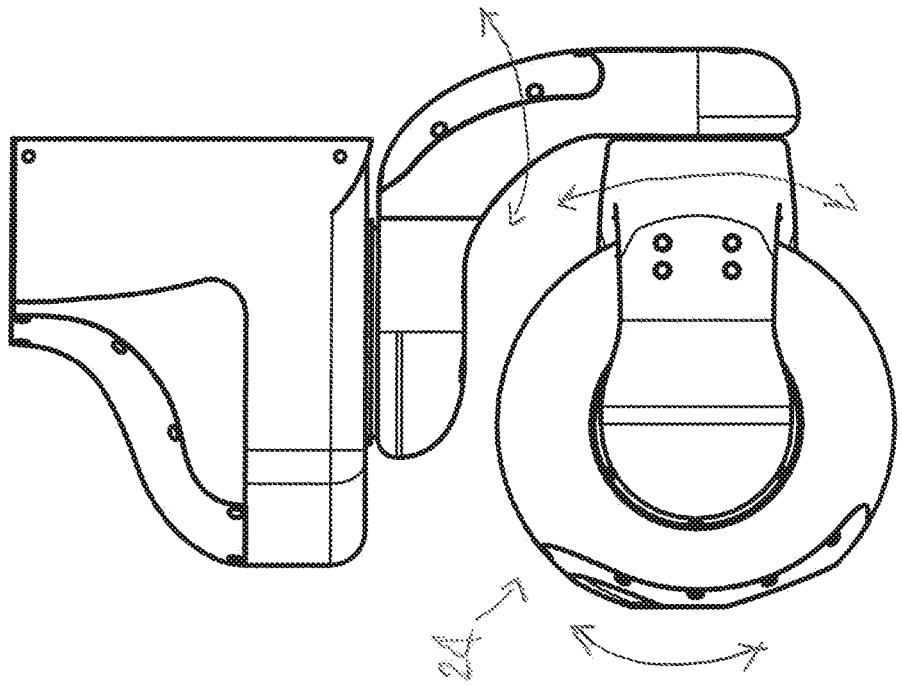
Figure 8:
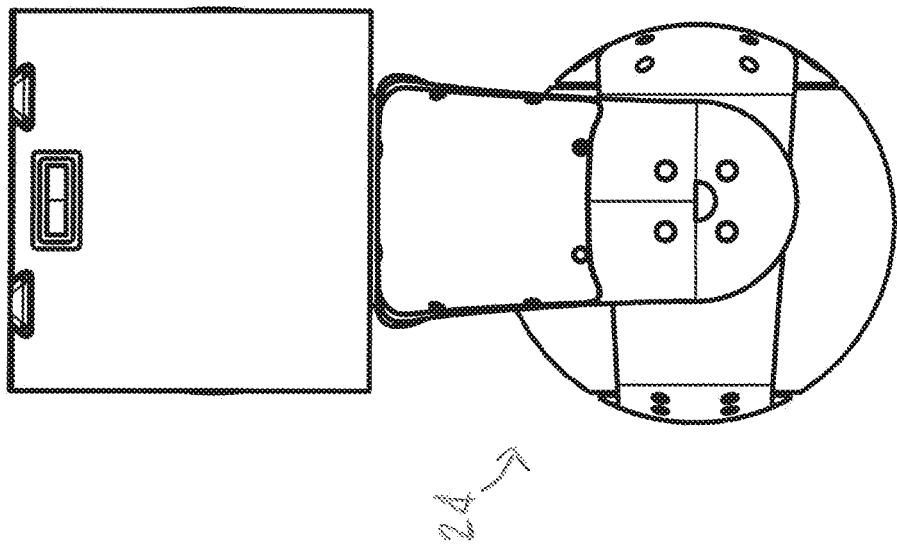
Figure 22:
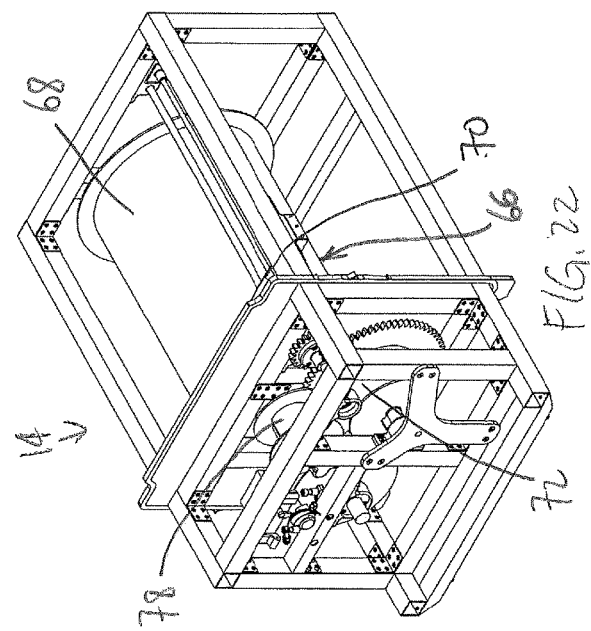
FIGS. 22 and 24 depict a cable-take up assembly useable with a base power station in accordance with the subject invention.
Figure 24:
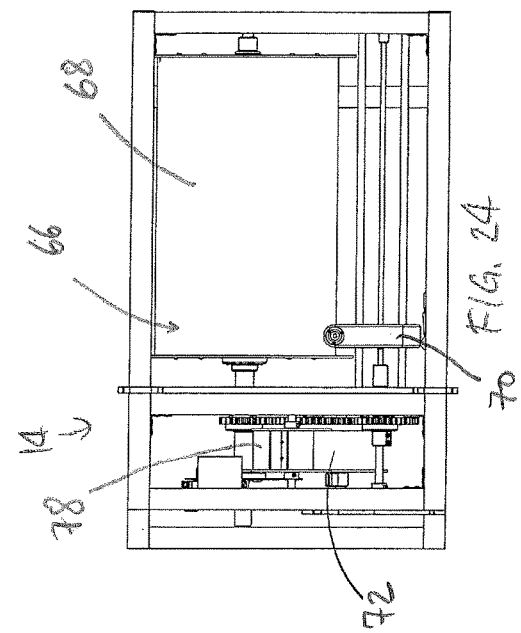
Figure 21:
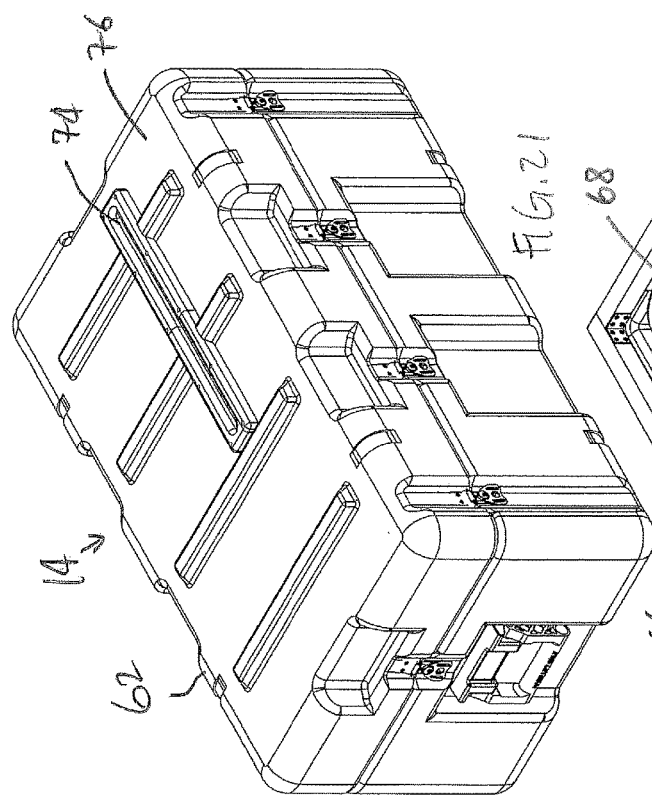
FIG. 21 is a perspective view of a base power station useable with the subject invention.
Figure 23:
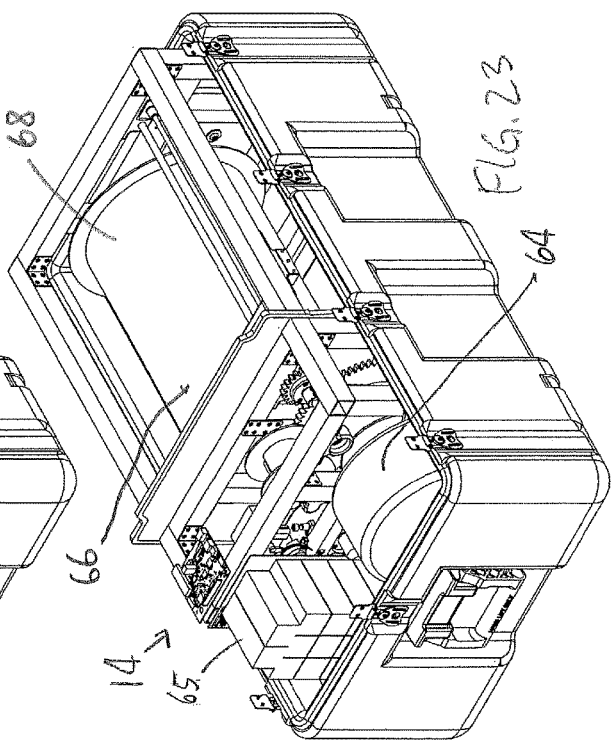
FIG. 23 is a perspective view of the base power station of FIG. 21 in an open state.

The UAV 12 may also include at least one video camera 24. The camera 24 may be digital and include enhanced modes, such as IR detection and night vision. The camera 24 may be provided as a standard digital camera, thermographic camera, multispectral camera, IR camera and/or night vision camera. The UAV 12 may include a plurality of cameras 24 of different types to allow for heat detection, IR detection, infrared detection (mid-wave (MWIR) and long wave (LWIR)), and/or night vision, separately from a standard digital video stream. The camera 24 may be gimbal mounted to have three rotational degrees of freedom (FIG. 9). A single camera 24 may include more than one lens 25 to provide for video capture in different modes (standard, IR, etc.). A memory 26 may be provided to store portions, or all, of the video data captured by the camera(s) 24. In addition, or alternatively, captured video data may be transmitted in real-time as a live feed via the transmitter/receiver 22. Optionally, a range finder (e.g., a laser range finder) may be provided with the UAV 12 to allow for measurements of distance to target objects or persons.

The CPU 20 may be operatively linked to the memory 26 to review the captured video data. This allows for detection of particular pre-determined anomalies. For example, the CPU 20 may be configured to detect objects and/or to detect movement of objects (above a certain physical size) within a monitored area (e.g., frame to frame comparison of known view). Object detection may be achieved using known captured image analysis, e.g., frame-based feature extraction. This provides for detection of a possible person in the monitored area, particularly during restricted hours. To limit false readings, authorized personnel may be provided with IR badges which emit a detectable IR pattern readable by the CPU 20. This offsets false detection of an authorized person within the monitored area. Alternatively, heat detection by thermographic camera may be utilized to identify unknown heat profiles in the monitored areas, particularly during restricted hours. The CPU 20 allows the UAV 12 to monitor a given region for pre-determined anomalies. With continuous power supplied from the tether 16, the UAV 12 may be airborne for extended periods of time for surveillance.

The CPU 20 may include artificial intelligence (AI) programming to control the UAV 12. The AI may control the flight characteristics of the UAV 12 in response to ambient conditions (e.g., wind, barometric pressure changes). Ambient sensors 28 (e.g., wind, barometric pressure, vibration) may be provided on the UAV 12 which are operatively linked with the CPU 20 to provide measured ambient data. Transducers may be utilized as needed to provide analog to digital conversion. The measured ambient data may be stored in the memory 26. Also, the measured ambient data may be transmitted in real-time, or transmitted from the memory 26 in batch form, via the transmitter/receiver 22. The measured ambient data may be used by the CPU 20, e.g., using AI, to predict needed maintenance, e.g., detection of excessive vibration as a possible indicator of a loose bearing. Sensors may be also provided to monitor electrical activity, e.g., whether the battery 18 is fully charged, whether power is being transmitted, voltage levels, amperage levels, etc. Electrical related data may be transmitted in real-time, or transmitted from the memory 26 in batch form, via the transmitter/receiver 22.

In addition, the CPU 20, using AI, may be used for object detection or recognition, particularly using stored video data in the memory 26 for reference.

Figure 25:
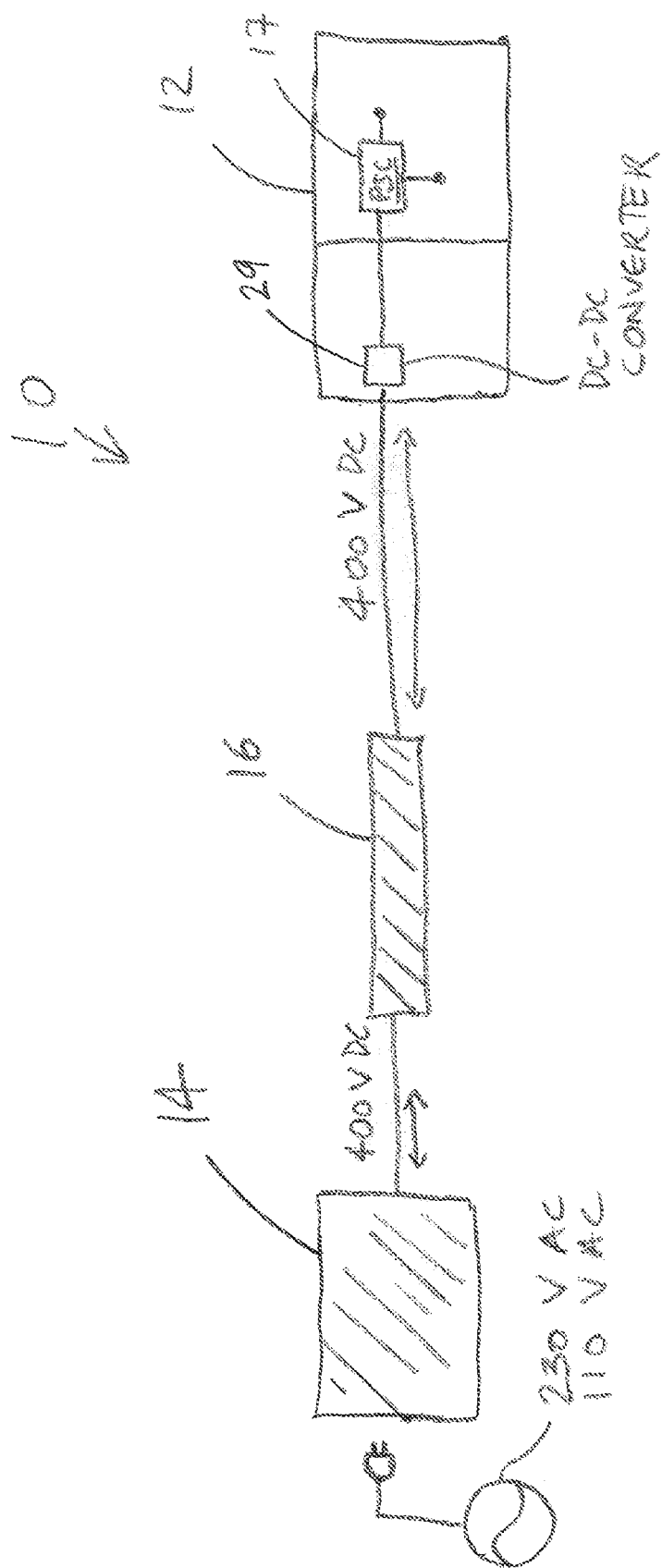
FIG. 25 is a schematic of an exemplary flow of power between the base power station and an UAV in accordance with the subject invention.

The tether 16 includes a flexible jacketed power transmission cable 30 to provide power to the UAV 12 in a hovering position. The power transmission cable 30 includes two conductive wires (supply S and return R) along its entire length to conduct electrical power from the base power station 14 to the UAV 12. With the UAV 12 requiring direct current, the required voltage for transmission may be relatively low, e.g., 24 V DC. The voltage across the power transmission cable 30 may be set higher than that required by the UAV 12. As shown in FIG. 25, a DC-DC converter 29 may be provided with the UAV 12 to convert the transmitted voltage to the voltage rated for the UAV 12. The power transmission cable 30 may be sized to handle a range of 12V-400V. For example, 400 V DC may be provided across the power transmission cable 30 with the DC-DC converter 29 stepping the voltage down to 24V DC for the UAV 12.

The power transmission cable 30 is weather-resistant, particularly against moisture. The tether 16 should be of a sufficiently robust structure to withstand tension during normal use. In addition, as discussed below, it is preferred that the tether 16 be sufficiently flexible to be coilable during use, as well as, during storage. The tether 16 may include synthetic fiber reinforcement, such as with Kevlar brand fibers.

Figure 33:
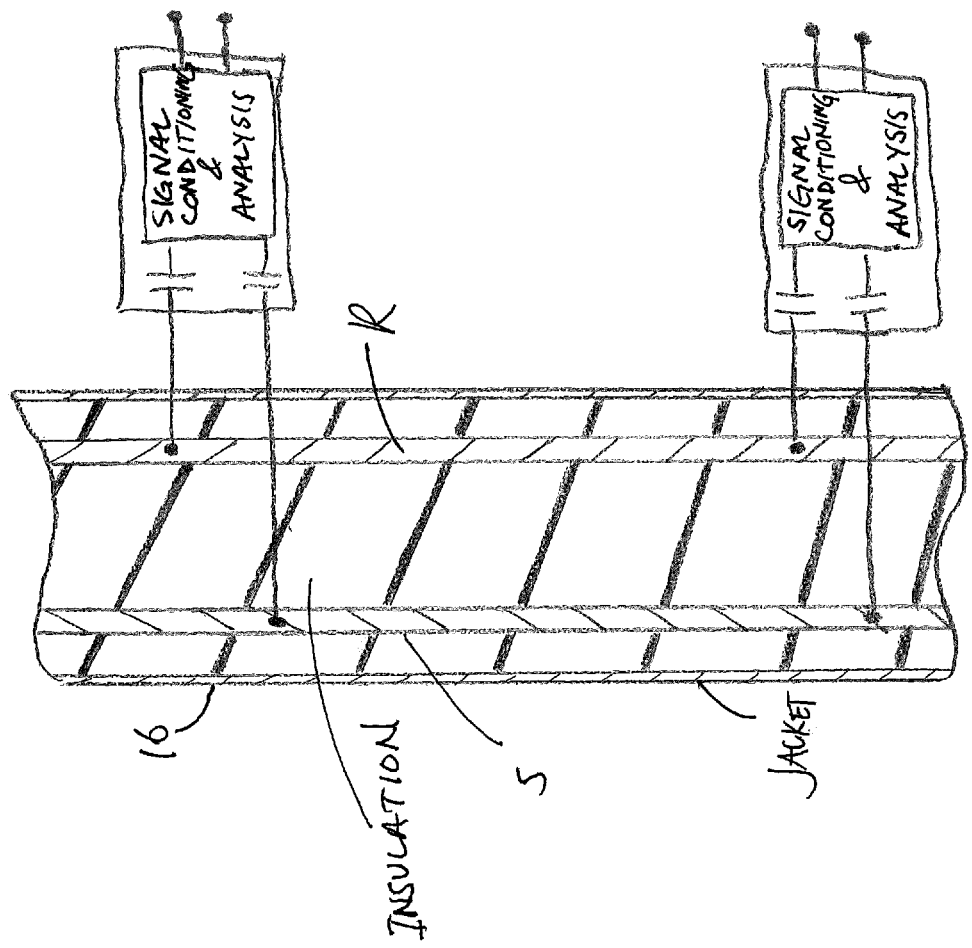
FIG. 33 shows schematically a tether with power cabling configured for "signal over power" data transmission in accordance with the subject invention; and, FIGS. 34-37 show a detachable power module useable with an UAV in accordance with the subject invention.
Figure 32:
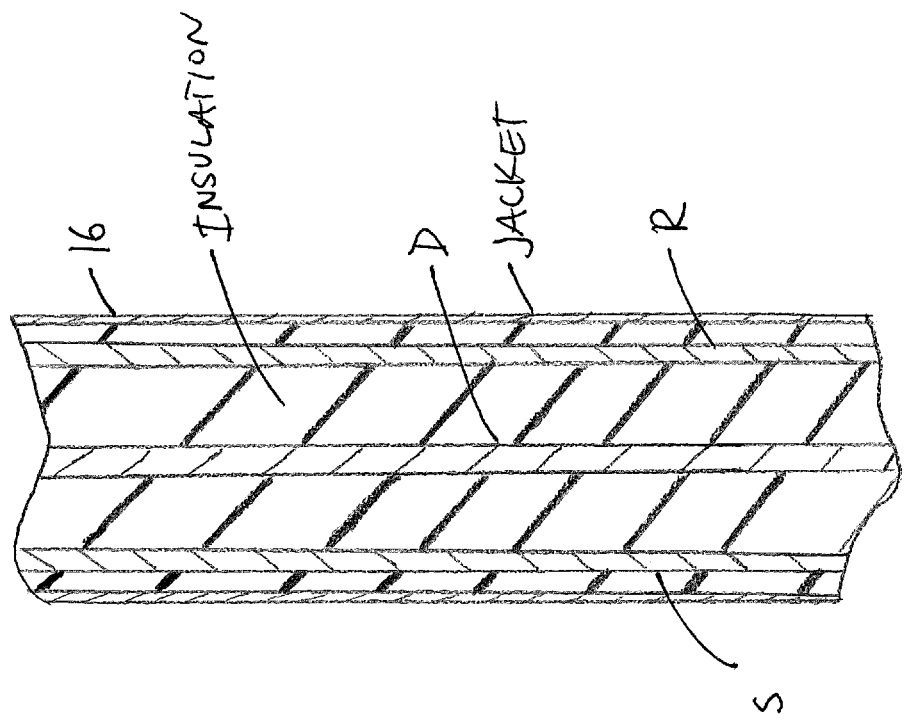
FIG. 32 shows schematically a tether with power cabling and data transmission cabling in accordance with the subject invention.
Figure 34:
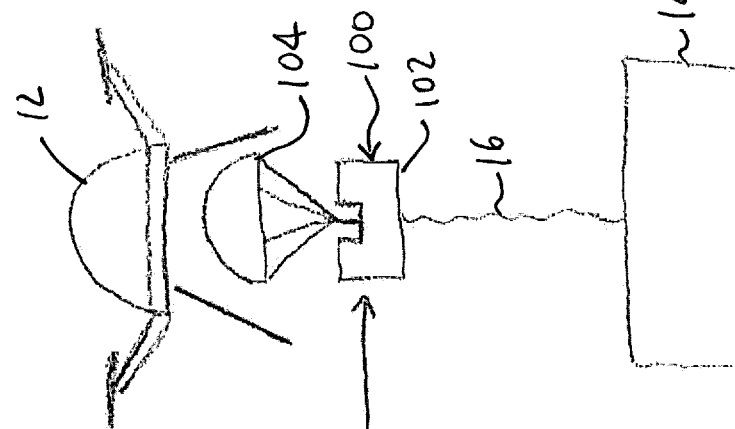
Figure 35:
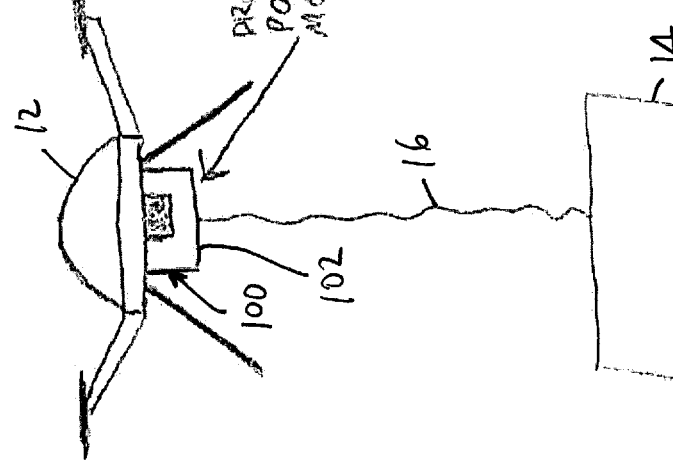

As shown in FIG. 32, the tether 16 may include one or more data transmission cables D in addition to the two conductive wires S, R to bi-directionally transmit any of the data transmittable or receivable by the wireless transmitter/receiver 22. The data transmission cables D may be of any known type, including being fiber optic, twisted pair cabling (e.g., CAT 5, CAT 5e, CAT 6, CAT 7), and so forth. Alternatively, as shown in FIG. 33, the conductive wires S, R may be configured to allow for "signal over power" data transmission. As shown in FIG. 33, signal conditioning is required for transmission and for use, thus, requiring signal conditioning modules in both the UAV 12 and the base power station 14. Data transmission through the tether 16 allows for hard-wire data transmission with the tether 16 coupled to the UAV 12. This may be preferred to minimize sabotage. Upon decoupling of the tether 16 from the UAV 12, the wireless transmitter/receiver 22 may be relied upon for wireless data communication.

As shown in FIGS. 18-20, a plug 32 is provided at an end of the tether 16 which includes pin holes 32, 34 to permit electrical connections with the supply and return wires, respectively, of the power transmission cable 30. The plug 32 includes a collar 38 for securing to the power transmission cable 30 in a robust manner. The collar 38 acts as a strain relief for the power transmission cable 30. A pair of indentations 40 are provided on the plug 32, preferably facing in opposing directions.

The UAV 12 includes a socket 42 for detachably coupling with the plug 32. The socket 42 includes pins 44 for insertion into the pin holes 34, 36 and for electrical coupling with the supply and return wires S, R, respectively, as shown schematically in FIG. 19A. A further variation of the plug 32 is shown in FIG. 19B. Connectors 45 may be also provided to allow connection of any data transmission cables D with wiring in the UAV 12 to allow for data transmission. The connectors 45 are preferably separable to decouple with the plug 32 decoupling from the socket 42. For example, push pull type fiber optic connectors may be utilized with fiber optic data cabling. The supply and return wires S, R may be jacketed by one or more layers of insulation. In addition, the data transmission cables D may be jacketed, e.g., as a bundle of fiber optic strands to form a fiber optic cable.

To retain the plug 32 in connection with the socket 42, a retaining mechanism 46 is provided which includes opposed, pivoting arms 48. Each of the pivoting arms 48 includes a free end 49 with a detent 50 formed to be insertingly received in one of the indentations 40. As shown in FIG. 19, the pivoting arms 48 are positioned on opposite sides of the plug 32 to pivot inwardly so that the detents 50 of both the pivoting arms 48 may be simultaneously received in both of the indentations 40. With this arrangement, removal of the plug 32 from the socket 42 is resisted.

The pivoting arms 48 may each pivot about axle 52. A tensioning compression spring 54 may be located in a recess 53 of the socket 42 to apply pressing force against at least one upper end 55 of the pivoting arms 48. This provides for a force acting to bias the detents 50 inwardly in a holding state with the plug 32. The force of the tensioning spring 54 maintains the detents 50 in the indentations 40.

To allow for detachment of the plug 32, a motor 56 (e.g., servo motor) may be provided linked to the pivoting arms 48 such that with rotation of an output shaft of the motor 56, free ends 49 of the pivoting arms 48 are caused to move apart. The motor 56 may be controlled by the CPU 20. As a result, the pivoting arms 48 pivot outwardly with the detents 50 becoming clear of the indentations 40. This allows for decoupling of the plug 32.

A secondary compression spring 60 may be provided in a recess 61 in the plug 32 configured to be compressed with the plug 32 seated in the socket 42 (with the detents 50 positioned in the indentations 40). With this arrangement, and with removal of the detents 50 from the indentation 40, the compressive force of the secondary compression spring 60 acts to urge the plug 32 out of the socket 42. Tension in the tether 16 may also act to urge the plug 32 out of the socket 42.

In an alternative arrangement, as shown in FIGS. 34-37, the tether 16 may include a power module 100 configured to be detachably coupled with the UAV 12, rather than the plug 32. The power module 100 may include an enclosure 102 containing any voltage converter (DC-DC, AC-DC). Decouplable electrical contacts may be used to electrically couple the enclosure 102 with the UAV 12 to allow power to flow from the power module 100 to the battery 18 and to allow bi-directional flow of data, if configured for data flow. The battery 18 remains on board on the UAV 12 with detachment of the power module 100. The power module 100 may be detachably coupled to the UAV 12 by an energizable electromagnet (e.g., a solenoid) located on one or both of the UAV 12 and the power module 100. Detachment may be controlled by the CPU 20, e.g., with a signal causing the electromagnet to de-energize. In addition, or alternatively, the power module 100 may be detachably coupled using releasable pins or latches. In a coupled state, the pins or latches may retentively engage the power module 100. With adjustment of the pins or latches out of engagement (e.g., by retraction, shifting, radial adjustment, and so forth), the power module 100 is not supported, thus being allowed to fall under force of gravity. Detachment may be controlled by the CPU 20, e.g., with a signal causing the pins or latches to adjust.

Figure 36:
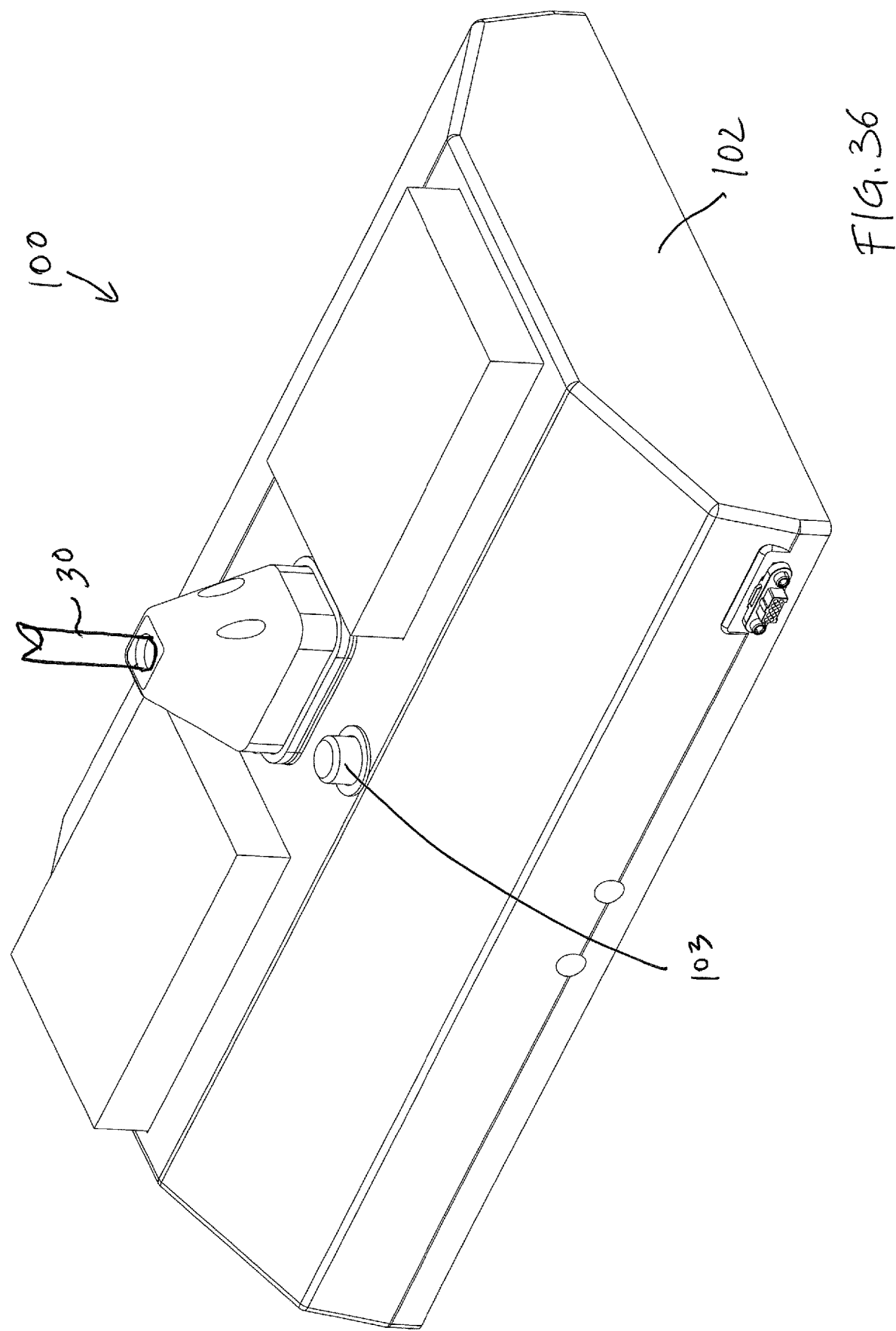
Figure 37:
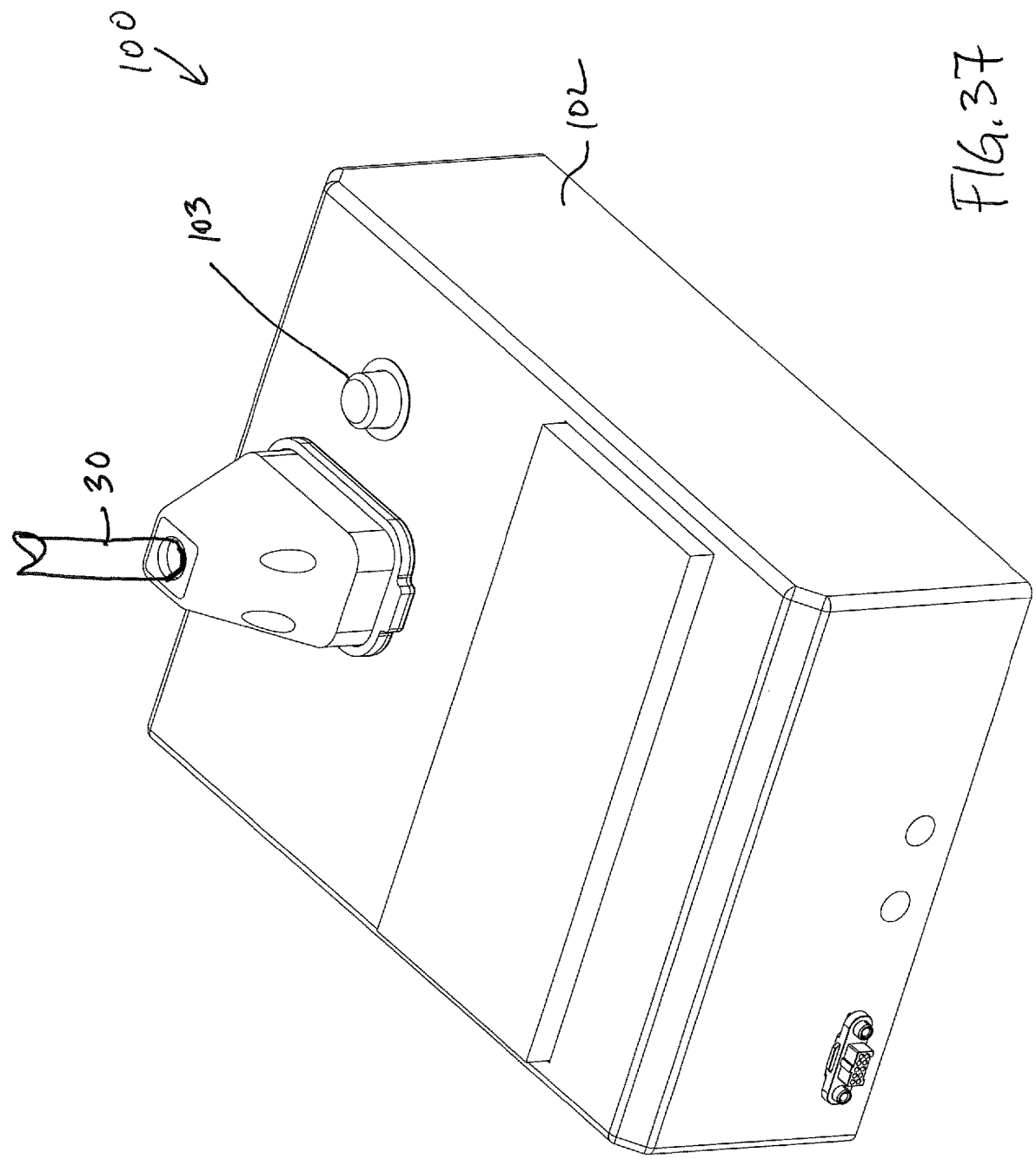

As shown in FIGS. 36 and 37, the power module 100 may be sized differently based on the related application, e.g., depending on size of any voltage transformer, voltage converter, and so forth. A light status indicator 103 may be provided to indicate by on/off or a colored lit status whether electrical power is being transmitted. The light status indicator 103 may include solid state lighting elements, such as light emitting diodes (LEDs) which allow for different light colors to be generated. This allows for different status indications, such as, power transmission, battery fully charged, A small parachute 104 may be provided on the plug 32 or the power module 100 that may be deployed with the plug 32 removed from the socket 42, particularly with the UAV 12 being airborne.

The base power station 14 may be provided in a case 62, such as a pelican case, particularly to be portable. The base power station 14 includes an AC/DC transformer 64. Power may be supplied with a standard plug connection from a standard source, i.e., the power grid (110 V AC/230V AC). The AC/DC transformer 64 may be electrically coupled to the power transmission cable 30 to provide the power transmission cable 30 with DC power. One or more capacitors 65 may be provide between the transformer 64 and the power transmission cable 30 to minimize power interruptions. An exemplary schematic of the flow of power is shown in FIG. 25. As understood by those skilled in the art, the actual voltage levels may vary.

As an alternative, the base power station 14 may provide alternating current (AC) power to the UAV 12. Here, the transformer 64 may not be required. Alternatively, the transformer 64 may be replaced in the base power station 14 as a voltage converter to alter voltage, but is not necessary. With AC source power, the DC-DC converter 29 on the UAV 12 may be provided as an AC/DC converter to convert the alternating current power to direct current power. Further, the base power station 14 may include a power module (AC-AC, AC-DC) for supplying the electrical power, in lieu of, or as a supplement to, standard source power (i.e., from the power grid).

A cable-take up assembly 66 may be provided in the case 62 to take up and/or let out the tether 16. The assembly 64 includes a barrel 68 about which the tether 16 may be coiled. A sliding guide 70 may be located adjacent to the barrel 68 through which the tether 16 passes. The sliding guide 70 is configured to slide along the length of the barrel 68 to distribute the tether 16 along the barrel 68 during a take up session. The barrel 68 is rotated by a torsion spring 72 which may be geared or directly connected to the barrel 68. Preferably, the torsion spring 72 is configured to turn the barrel 68 in one rotational direction, particularly in a direction to take up the tether 16 on the barrel 68. A slot 74 may be provided in a cover 76 of the case 62 through which the tether 16 may be taken up or let out. The slot 74 is axially aligned with the barrel 68. The plug 32 may be formed larger than the slot 74 so as to not be passable through the slot 74.

The assembly 66 may include a brake 78. The brake 78 is configured to selectively resist rotation of the barrel 68. Tension (pulling force) on the tether 16 from the UAV 12 allows for the tether 16 to be let out responsively against opposing rotation force of the torsion spring 72. In this manner, the tether 16 may be maintained in tension between the UAV 12 and the base power station 14. With release of the plug 32 from the socket 42, the tension is released with the torsion spring 72 causing the tether 16 to be taken up on the barrel 68. The brake 78 is applied at the end of take up to lock the barrel 68. The locked state may be used for storage and transportation of the base power station 14. The brake 78 is released to allow for the tether 16 to be let out for next use. A manual override may be provided, allowing for manual adjustment of tension (increase, slacken). A clutch may be provided to disconnect from the torsion spring 72 to allow for manual adjustment.

The system 10 is useable to monitor a given area. The UAV 12 may be connected to the tether 16 on the ground (using the plug 32 and the socket 42) by an operator with the UAV 12 caused to hover at a target height. With the tether 16 coupled to the UAV 12, and with the UAV 12 airborne, the UAV 12 receives power continuously. Some of the power may be diverted to ensure that the rechargeable battery 18 is fully charged. If power from the tether 16 is lost or the tether 16 is disconnected, the UAV 12 switches over to the rechargeable battery 18. As shown in FIGS. 2 and 25, a power switching controller 17 may be used to direct power from the power transmission cable 30 to the battery 18 and/or the components of the UAV 12 as needed, and, to, when detecting lack of power from the power transmission cable 30, directing power from the battery 18 to the components of the UAV 12 as needed.

The UAV 12 may be decoupled from the tether 16 to allow for unrestricted flying (by release of the plug 32 from the socket 42). This allows for the UAV 12 to go on regular patrol missions as well as to fly in response to a detected anomaly. In addition, the UAV 12 may decouple if a problem with the system 10 is detected, such as power loss, or ambient conditions are appearing which may excessively stress the coupling. An anomaly may be detected as a target in the manner described above where the CPU 20 determines an unrecognized person or object is identified in the monitored area.

The UAV 12 may fly autonomously under control of the CPU 20. The camera 24 and/or the ambient sensors 28 may be utilized to provide inputs for the UAV 12. The UAV 12 may also rely on external grids or signals, such as an ultrasonic network. The UAV 12 may fly in a predetermined pattern (patrol mission) during which data is captured. The UAV 12 may rely on generated signals and responses thereto in controlling flying, e.g., signals being generated by LIDAR, IR sensors, stereovision, and so forth. In addition, the UAV 12 may fly responsively, e.g., by tracking an identified target (e.g., anomaly). Restrictions may be placed on the flight of the UAV 12, e.g., defined boundaries. Target location may also cause fixed hovering over the acquired target. Control over the flight of the UAV 12 may be switched to an operator.

Figure 26:
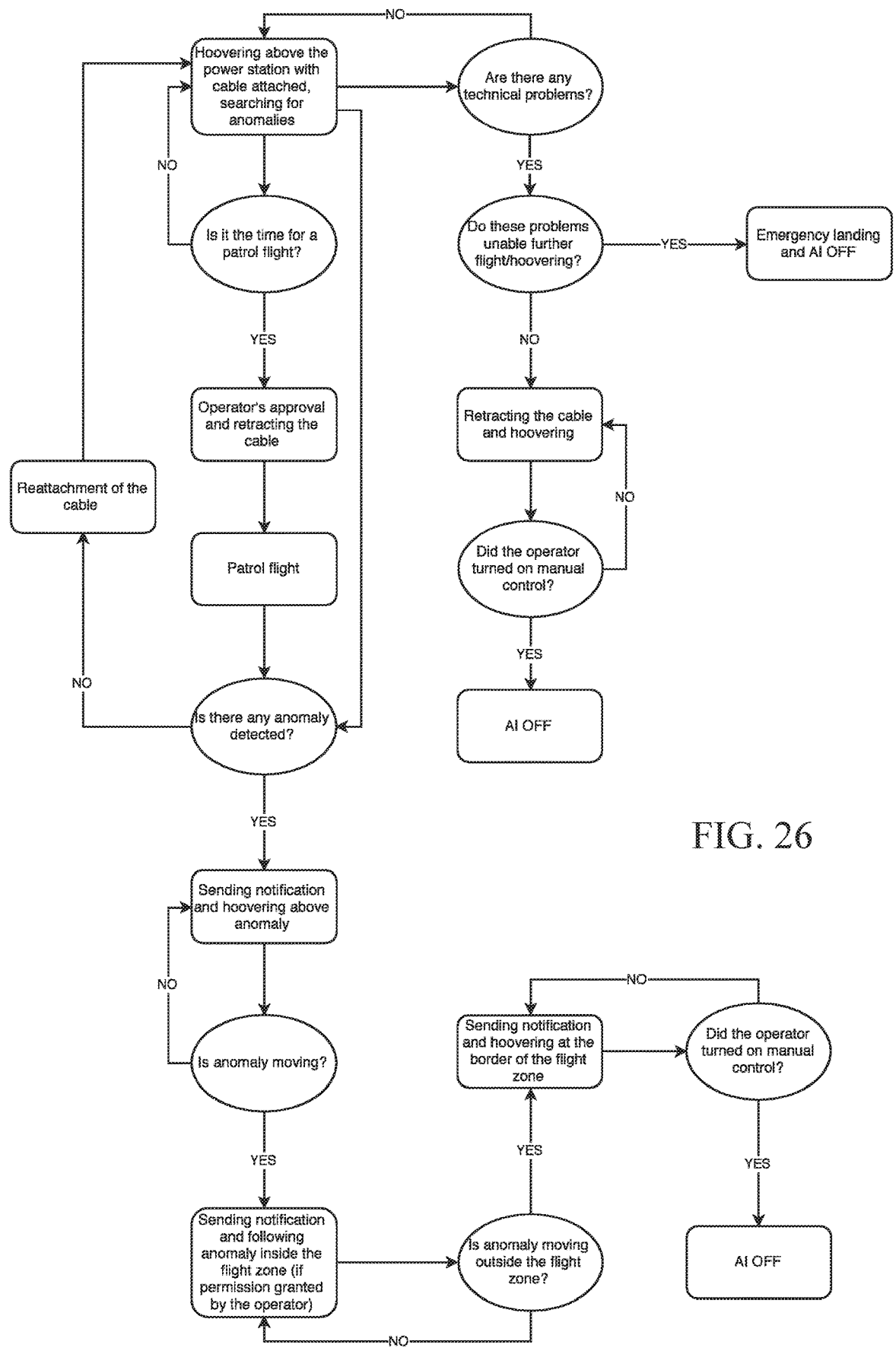
FIG. 26 is a flowchart of an exemplary process control for an UAV in accordance with the subject invention.

With reference to FIG. 26, a flowchart is provided of a possible process control of the UAV 12. The process control may be controlled by the CPU 20 (e.g., acting as AI) and/or by an operator (communicated with via the transmitter/receiver 22). The base power station 14 may be provided with a transmitter/receiver 78 to act as an intermediary with the transmitter/receiver 22. An operator may utilize any wireless device 80 having a transmitter/receiver. The wireless device 80 may include application software with an interface which permits an operator to provide instructions to the UAV 12. The interface may also allow inspection of data captured and transmitted by the UAV 12. Preferably, the wireless device 80 is web-enabled.

What is claimed is:

1. A surveillance drone system comprising:
an unmanned aerial vehicle having a socket;
a base power station; and,
a tether extending from the base power station, said tether including a plug at one end configured to be detachably coupled with the socket of the unmanned aerial vehicle so as to transmit electrical power to the unmanned aerial vehicle when airborne, wherein said plug includes indentations and said unmanned aerial vehicle includes arms formed to be selectively received in said indentations so that, with the plug coupled to the socket and said arms received in said indentations, said arms resist removal of the plug from the socket.

2. The system as in claim 1, wherein said unmanned aerial vehicle includes a rechargeable battery.

3. The system as in claim 1, wherein said base power station includes a cable-take up assembly configured to take up said tether.

4. The system as in claim 1, wherein said unmanned aerial vehicle is of a multi-rotor type.

5. The system as in claim 1, wherein said unmanned aerial vehicle is of a single rotor type.

6. The system as in claim 1, wherein said unmanned aerial vehicle includes a computing processing unit configured to control said unmanned aerial vehicle.

7. The system as in claim 1, wherein said unmanned aerial vehicle includes at least one video camera.

8. The system as in claim 1, wherein said unmanned aerial vehicle includes a DC-DC converter.

9. The system as in claim 1, wherein said unmanned aerial vehicle includes an AC-DC converter.

10. The system as in claim 1, wherein said base power station includes a case.

11. The system as in claim 10, wherein a rotatable barrel is located inside said case about which said tether is coiled.

12. The system as in claim 11, wherein a slot is formed in said case through which said tether passes in extending from said barrel.

13. The system as in claim 11, wherein a torsion spring is provided to act on said barrel in providing tension to said tether when coupled with said unmanned aerial vehicle.

14. The system as in claim 11, wherein a brake is provided to resist rotation of said barrel.

15. The system as in claim 1, wherein said tether includes supply and return conductive wires to conduct electrical power from said base power station to said unmanned aerial vehicle.

16. The system as in claim 15, wherein said tether includes at least one data transmission cable.

17. The system as in claim 1, wherein said arms are each pivotable.

* * * * *